United States Patent
Lindoff et al.

(10) Patent No.: US 10,237,761 B2
(45) Date of Patent: *Mar. 19, 2019

(54) CONTROLLER ARRANGEMENT, METHOD AND COMPUTER PROGRAM

(71) Applicant: Telefonaktiebolaget LM Ericsson (publ), Stockholm (SE)

(72) Inventors: Bengt Lindoff, Bjarred (SE); Peter Alriksson, Horby (SE); Niklas Andgart, Sodra Sandby (SE); Johan Eker, Lund (SE); Andres Reial, Malmo (SE)

(73) Assignee: TELEFONAKTIEBOLAGET LM ERICSSON (publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 15/870,907

(22) Filed: Jan. 13, 2018

(65) Prior Publication Data

US 2018/0152855 A1 May 31, 2018

Related U.S. Application Data

(63) Continuation of application No. 14/649,869, filed as application No. PCT/EP2015/061277 on May 21, 2015, now Pat. No. 9,906,965.

(51) Int. Cl.
*H04W 24/02* (2009.01)
*G05D 1/00* (2006.01)
(Continued)

(52) U.S. Cl.
CPC .......... *H04W 24/02* (2013.01); *G05D 1/0088* (2013.01); *G05D 1/0276* (2013.01);
(Continued)

(58) Field of Classification Search
CPC .. G05D 1/0088; G05D 1/0276; G05D 1/0011; G05D 1/0214; G05D 2201/0213;
(Continued)

(56) References Cited

U.S. PATENT DOCUMENTS

| | | | |
|---|---|---|---|
| 7,358,849 | B1 | 4/2008 | Pesina |
| 8,213,978 | B1 | 7/2012 | Ho et al. |
| 9,545,520 | B2 | 1/2017 | Matos |
| 9,906,965 | B2 * | 2/2018 | Lindoff ................ H04W 24/02 |
| 2003/0073432 | A1 | 4/2003 | Meade, II |
| 2008/0220687 | A1 | 9/2008 | Taya |

(Continued)

OTHER PUBLICATIONS

Malmborg, Jorgen "Analysis and Design of Hybrid Control Systems" Department of Automatic Control, Lund Institute of Technology, Lund, Sweden, 1998, pp. 1-142, ISSN: 0280-5316.

(Continued)

*Primary Examiner* — Magdi Elhag
(74) *Attorney, Agent, or Firm* — Leffler Intellectual Property Law, PLLC

(57) ABSTRACT

A controller arrangement comprising a transceiver capable of communication via a wireless communication network, a controller arranged to control a physical entity at which the controller arrangement is arranged, and an interface between the transceiver and the controller is disclosed. The transceiver is arranged to provide information via the interface about present or imminent interrupts in the communication via the wireless network. The controller is arranged to operate in at least a first state when the information indicates that no interrupts are present or imminent, wherein the first state includes closed loop control from a remote entity via the wireless communication network, and a second state when the information indicates that interrupts are present or (Continued)

imminent, wherein the second state includes autonomous control operations by the controller. A method and computer program are also disclosed.

17 Claims, 14 Drawing Sheets

(51) Int. Cl.
*H04W 76/19* (2018.01)
*G05D 1/02* (2006.01)
*G08C 17/02* (2006.01)
*H04W 36/08* (2009.01)
*H04W 76/28* (2018.01)
*H04L 29/08* (2006.01)
*H04W 76/30* (2018.01)

(52) U.S. Cl.
CPC ............ *G08C 17/02* (2013.01); *H04W 36/08* (2013.01); *H04W 76/19* (2018.02); *H04W 76/28* (2018.02); *H04L 67/12* (2013.01); *H04W 76/30* (2018.02)

(58) Field of Classification Search
CPC ........ G05D 1/0055; G05D 1/028; G05D 1/12; G05D 2201/021; G08C 17/02; G08C 2201/30; G08C 2200/00; G08C 2201/91; G08C 2201/93; H04W 4/008; H04W 24/02; H04W 28/12
See application file for complete search history.

(56) References Cited

U.S. PATENT DOCUMENTS

| | | |
|---|---|---|
| 2011/0053624 A1 | 3/2011 | Trottier et al. |
| 2013/0090068 A1 | 4/2013 | Naruse et al. |
| 2015/0092597 A1 | 4/2015 | Guo et al. |
| 2015/0282282 A1 | 10/2015 | Breuer et al. |
| 2016/0157090 A1 | 6/2016 | Huang et al. |
| 2016/0364981 A1 | 12/2016 | Towers et al. |
| 2017/0102701 A1 | 4/2017 | Pack et al. |
| 2017/0105091 A1 | 4/2017 | Gonnet et al. |

OTHER PUBLICATIONS

Bemporad, A. et al. "Decentralized Hybrid Model Predictive Control of a Formation of Unmanned Aerial Vehicles" Proceedings of the 2011 18th IFAC World Congress, Milano, Italy, vol. 18, Part 1, pp. 11900-11906.

Nilsson, Johan "Real-Time Control Systems with Delays" Department of Automatic Control, Lund Institute of Technology, Lund, Sweden, 1998, pp. 1-141, ISSN: 0280-5316.

PCT International Search Report, dated Feb. 5, 2016, in connection with International Application No. PCT/EP2015/061277, all pages.

* cited by examiner

CONTROLLER ARRANGEMENT, METHOD AND COMPUTER PROGRAM

CROSS-REFERENCE TO RELATED APPLICATIONS

This application claims the benefit of U.S. application Ser. No. 14/649,869 filed Jun. 4, 2015 (371(c) date), which is a 35 U.S.C. § 371 national stage of international application PCT/EP2015/061277 filed May 21, 2015. All of these earlier applications are hereby incorporated herein by reference in their entireties.

TECHNICAL FIELD

The present invention generally relates to a controller arrangement comprising a transceiver capable of communication via a wireless communication network, a controller arranged to control a physical entity at which the controller arrangement is arranged, and an interface between the transceiver and the controller, method of such a controller arrangement, and a computer program for implementing the method.

BACKGROUND

A traditional control system can basically be seen as a controller providing a control signal to one or more actuators affecting a physical entity, such as a machine or process, wherein one or more sensors determine actual conditions of the physical entity and provide feedback signals to the controller which compares, using a more or less complex control model, the conditions with desired conditions to provide the control signal with aim to make the actual conditions agree with the desired conditions. Sometimes, it is desirable to provide remote control via a network, e.g. a wireless network.

Traditionally, distributed automation systems have been connected using physical wires but with advent of technologies such as WiFi, Bluetooth, ZigBee, WirelessHART etc., wireless control have become commonplace. An important factor for automation systems is latency and with cellular systems of fourth generation coming down to round trip delays at around 20-40 milliseconds cellular technologies are becoming an interesting alternative that in addition to existing solutions offer better range, mobility and centralized management. FIG. 1 shows a distributed control system 100 where a sensor 102 and an actuator 104 are connected to a control node 106 over a network 108 for performing control of a process 110. The performance of the system 100 is highly dependent on information about communication delays 112, 114. If the network 108 is wireless the system 100 must also handle the case when connectivity is lost.

FIG. 2 shows a hierarchical control system 200 with a local controller 202 and a supervisory controller 204. This setup is common in for example robotics and the process industry. The local controller 202 may be a standard PID (Proportional Integral Derivative) controller and the supervisory controller 204 provides set point values. In the robotics case the trajectory may be remotely generated and while the control loops for the individual joints execute locally. Another example is coordination of autonomous aerial vehicles, as disclosed by A. Bemporad and C. Rocchi in the article "Decentralized Hybrid Model Predictive Control of a Formation of Unmanned Aerial Vehicles", where the supervisory controller 204 runs a model predictive controller (MPC) for generating trajectories, mission planning and handle collision avoidance and the actual flight control system (stabilization, etc.) runs locally by the local controller 202.

Control systems may be arranged to operate in different modes and where each mode possibly corresponds to a different control strategy. A number of examples of hybrid control systems are disclosed in the PhD Thesis by Jorgen Malmborg, "Analysis and Design of Hybrid Control Systems", Lund University. For example the hybrid controller in FIG. 3, which is represented as a Grafcet diagram with four states and two control modes. One mode is using an optimal approach (Opt Controller), e.g. when changing set point, and a PID controller (PID Controller) when the system output is close to the set-point. In the case of the autonomous aerial vehicles, as discussed in in the article "Decentralized Hybrid Model Predictive Control of a Formation of Unmanned Aerial Vehicles" by A. Bemporad and C. Rocchi, a hybrid control strategy may be applied to handle loss of connectivity.

From the discussion above, the need of an approach how to handle distributed control in view of connectivity is evident.

SUMMARY

The invention is based on the understanding that control via a wireless network may imply delays that are not compatible with the control task. The inventors have found that by adapting control approach based on state of communication over the network, efficient control may be provided also where a supervisory controller is involved in the control via a wireless communication network.

According to a first aspect, there is provided a controller arrangement comprising a transceiver capable of communication via a wireless communication network, a controller arranged to control a physical entity at which the controller arrangement is arranged, and an interface between the transceiver and the controller. The transceiver is arranged to provide information via the interface about present or imminent interrupts in the communication via the wireless network. The controller is arranged to operate in at least a first state when the information indicates that no interrupts are present or imminent, wherein the first state includes closed loop control from a remote entity via the wireless communication network, and a second state when the information indicates that interrupts are present or imminent, wherein the second state includes autonomous control operations by the controller.

The wireless communication network may comprise a cellular communication network and the transceiver may provide the information about present or imminent interrupts in the communication based on mobility management information associated with the wireless communication network. The mobility management information associated with the wireless communication network may comprise any of measurement execute instruction, handover execute instruction, measurement completed, handover completed, release connection with redirect instruction, release connection with redirect completed, connection reestablishment instruction, and connection reestablishment completed. The mobility management information associated with the wireless communication network may comprise instructions provided from a node of the wireless communication network. The mobility management information associated with the wireless communication network may comprise indications on a completed task provided from the transceiver.

The wireless communication network may comprise a short range communication network and the transceiver may provide the information about present or imminent interrupts in the communication based on connection state information in relation to an access point of the wireless communication network. The connection state information in relation to the access point of the wireless communication network may comprise any of in-synchronization with the access point, out-of-synchronization with the access point, scanning for access points ongoing, reconnection to an access point ongoing, authentication process, and association process.

The second state may comprise a first sub-state when the information indicates that interrupts are present or imminent during predetermined periods, wherein the first sub-state includes open loop control from the remote entity via the wireless communication network in conjunction with the autonomous control operations by the controller, and a second sub-state when the information indicates that interrupts are present or imminent during an unknown time, wherein the second sub-state includes the autonomous control operations by the controller without control from the remote entity via the wireless communication network. The first sub-state may be when the information indicates that the transceiver is to be connected to the same node of the wireless communication network after the interrupt as before the interrupt, and the second sub-state may be when the information indicates that the transceiver is to be connected to another node of the wireless communication network after the interrupt than before the interrupt. The first sub-state may be when a duration of the interrupt is known and below a threshold, and the second sub-state may be when the duration of the interrupt is unknown or above the threshold.

According to a second aspect, there is provided a method of a controller arrangement comprising a transceiver capable of communication via a wireless communication network and a controller arranged to control a physical entity at which the controller arrangement is arranged. The method comprises providing information by the transceiver to the controller about present or imminent interrupts in the communication via the wireless network, and operating the controller in at least a first state when the information indicates that no interrupts are present or imminent, wherein the first state includes closed loop control from a remote entity via the wireless communication network, and a second state when the information indicates that interrupts are present or imminent, wherein the second state includes autonomous control operations by the controller.

The providing of the information about present or imminent interrupts in the communication may be based on mobility management information associated with the wireless communication network. The mobility management information associated with the wireless communication network may comprise any of measurement execute instruction, handover execute instruction, measurement completed, handover completed, release connection with redirect instruction, release connection with redirect completed, connection reestablishment instruction, and connection reestablishment completed. The mobility management information associated with the wireless communication network may comprise instructions provided from a node of the wireless communication network. The mobility management information associated with the wireless communication network may comprise indications on a completed task provided from the transceiver.

The wireless communication network may comprise a short range communication network and providing of the information by the transceiver about present or imminent interrupts in the communication may be based on connection state information in relation to an access point of the wireless communication network. The connection state information in relation to the access point of the wireless communication network may comprise any of in-synchronization with the access point, out-of-synchronization with the access point, scanning for access points ongoing, reconnection to an access point ongoing, authentication process, and association process.

The second state may comprises a first sub-state when the information indicates that interrupts are present or imminent during predetermined periods, wherein the operating of the controller in the first sub-state includes open loop control from the remote entity via the wireless communication network in conjunction with the autonomous control operations by the controller, and a second sub-state when the information indicates that interrupts are present or imminent during an unknown time, wherein the operating of the controller in the second sub-state includes the autonomous control operations by the controller without control from the remote entity via the wireless communication network. The first sub-state may be when the information indicates that the transceiver is to be connected to the same node of the wireless communication network after the interrupt as before the interrupt, and the second sub-state may be when the information indicates that the transceiver is to be connected to another node of the wireless communication network after the interrupt than before the interrupt. The first sub-state may be when a duration of the interrupt is known and below a threshold, and the second sub-state may be when the duration of the interrupt is unknown or above the threshold.

According to a third aspect, there is provided a computer program comprising instructions which, when executed on a processor of a communication apparatus, causes the communication apparatus to perform the method according to the second aspect.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings.

DETAILED DESCRIPTION

Figure 1:
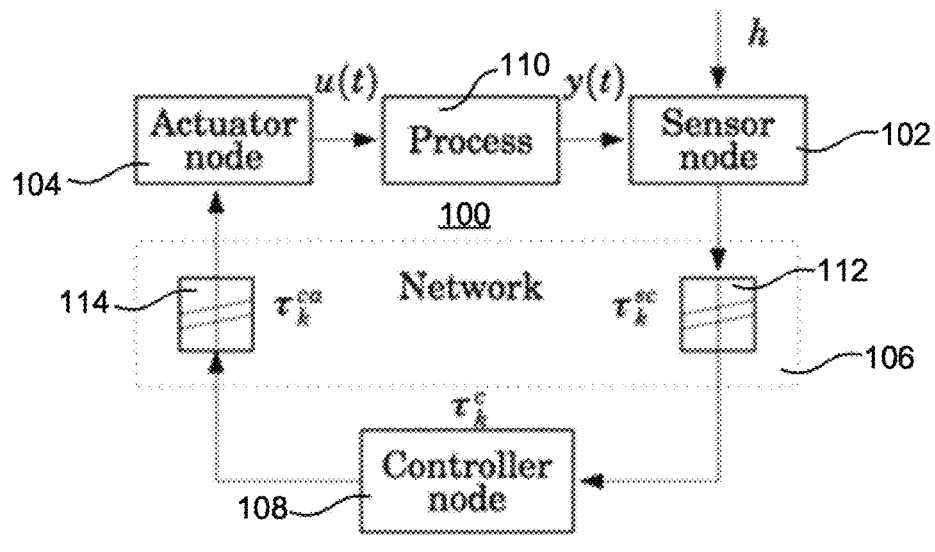
FIG. 1 schematically illustrates a distributed control system.
Figure 2:
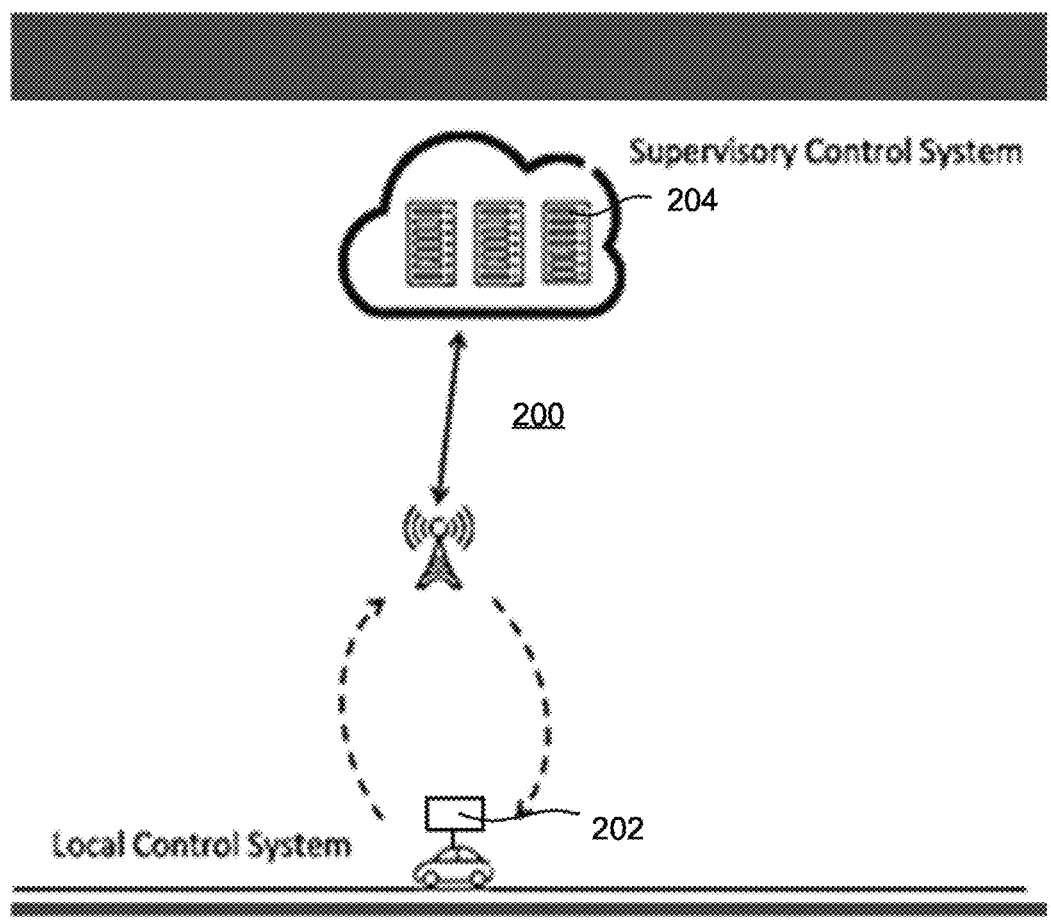
FIG. 2 shows a hierarchical control system.
Figure 3:
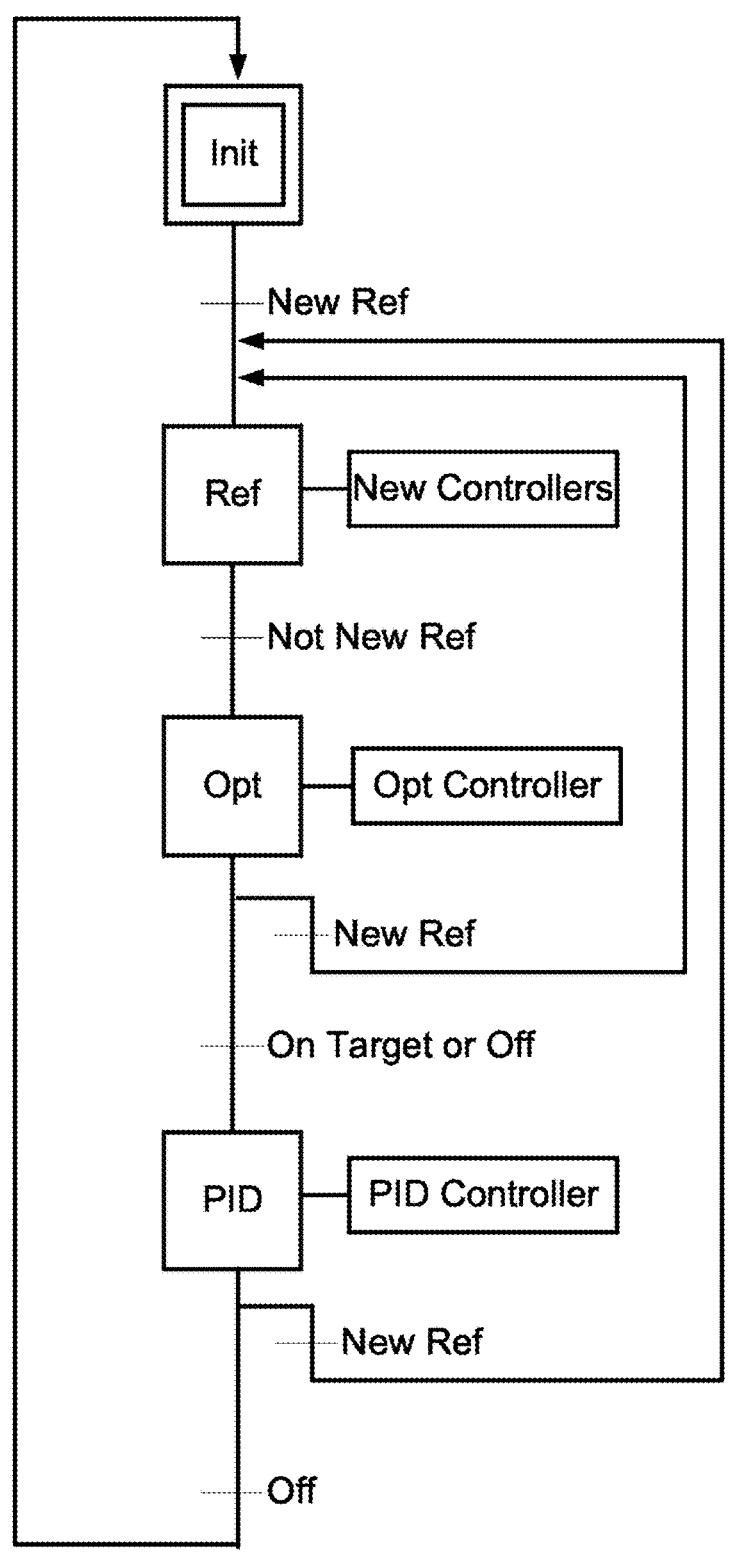
FIG. 3 is a Grafcet diagram illustrating a hybrid controller.
Figure 4:
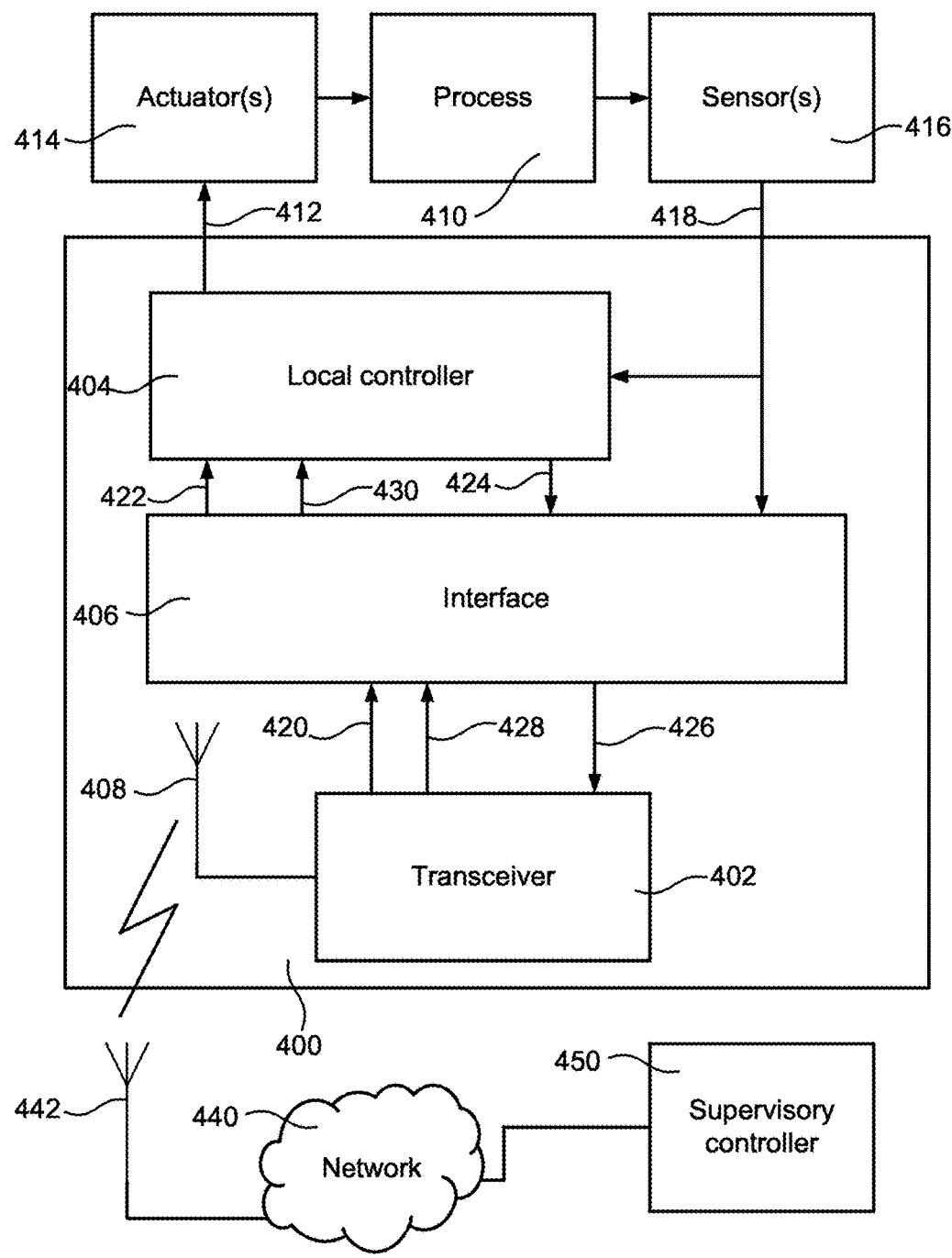
FIG. 4 schematically illustrates a controller arrangement according to an embodiment and a supervisory controller acting via a wireless network.

FIG. 4 schematically illustrates a controller arrangement 400 according to an embodiment and a supervisory controller 450 acting via a wireless communication network 440. The controller arrangement 400 comprises a transceiver 402, a local controller 404 and an interface 406 between the transceiver 402 and the local controller 404. The transceiver 402 is capable of communication via the wireless communication network 440, as indicated by antenna 408 of the transceiver 402 and antenna 442 of the wireless communication network 440.

The local controller 404 is arranged to control a physical entity 410, e.g. a machine and/or a process. For this, the controller arrangement 400 is arranged in vicinity of the physical entity 410, such that a control signal 412 is provided to one or more actuators 414 which act on the physical entity 410. One or more sensors 416 monitor actual states, values, etc. of the physical entity 410 and provide sensor signal(s) 418 to the controller arrangement 400.

The supervisory controller 450 is arranged to provide control information and control signals to the controller arrangement 400 via the wireless communication network 440 such that the control signal 412 may emanate from the supervisory controller 450, at least partially as for example discussed in the introductory portion of this disclosure. In FIG. 4 it is illustrated that all control signals 412 are provided by or through the local controller 404, but control signals 412 emanating from the supervisory controller 450 may also be provided to the actuator(s) 414 without involving the local controller 404. In such cases, some of the control signals 412 may for example be provided directly from the interface 406 to the actuator(s) 414. Similar, the supervisory controller 450 is arranged to receive information about sensor values and/or states, and optionally also states of the local controller 404, via the wireless communication network 440.

The transceiver 402 is arranged to provide information via the interface 406 about present or imminent interrupts in the communication via the wireless communication network 440. For example, when the wireless communication network comprises a cellular communication network, the transceiver may provide the information about present or imminent interrupts in the communication based on mobility management information associated with the wireless communication network. The mobility management information may for example comprises any of measurement execute instruction, handover execute instruction, measurement completed, handover completed, etc. Examples will be further discussed with reference to e.g. FIGS. 8 to 12.

The local controller 404 is arranged to operate in at least a first state when the information indicates that no interrupts are present or imminent. The first state includes closed loop control from the supervisory controller 450 via the wireless communication network 440. The local controller 404 is arranged to operate in a second state when the information indicates that interrupts are present or imminent. The second state includes autonomous control operations by the local controller 404.

The second state may comprise different sub-states depending on the nature of the present or imminent interrupts in communication. For example, a first sub-state may be when the information indicates that interrupts are present or imminent during predetermined periods, wherein open loop control from the supervisory controller 450 may be performed via the wireless communication network 440 in conjunction with the autonomous control operations by the local controller 404 when in the first sub-state, and a second sub-state may be when the information indicates that interrupts are present or imminent during an unknown time, wherein autonomous control operations may be performed by the local controller 404, i.e. without control from the supervisory control, when in the second sub-state. Further sub-states may be applied, e.g. based on known or estimated durations of interrupts wherein the autonomous control approach depends on the known or estimated duration. Estimated duration may in this case be based on historical data, e.g. for the actual location of the controller arrangement 400, and thus the transceiver 402.

Here, the states or sub-states including autonomous control discussed above may include that one or some of the one or more actuators 414 are disabled and/or put in some fail-safe position or state. This may provide for robust control also without the closed-loop supervisory control although some control features may be omitted. The design of this may depend on the nature of the physical entity 410.

Considering the example above, the first sub-state may be applied when the information indicates that the transceiver is to be connected to the same node of the wireless communication network after the interrupt as before the interrupt, e.g. for a cellular communication system 440, and the second sub-state is when the information indicates that the transceiver is to be connected to another node of the wireless communication network after the interrupt than before the interrupt, e.g. for a handover situation in the cellular communication system 440.

Another consideration of the example above may be that the first sub-state is applied when a duration of the interrupt is known and below a threshold, and the second sub-state is applied when the duration of the interrupt is unknown or above the threshold.

For the application of the approach demonstrated above, there is a need for information exchange between the communication handling parts, i.e. associated with the transceiver 402, and the control handling parts, i.e. the local controller 404. This is handled by the interface 406. The interface 406 may be a physical entity, but may as well be a functional or logical entity implemented in the transceiver 402 and/or the local controller 404. However, for the understanding of the function of the interface 406, it will be explained as a physical entity, but from that understanding, an implementation in the transceiver 402 and/or the local controller 404 should be readily understood by an artisan.

The interface 406 receives a control data signal 420 from the transceiver 402. The control data is payload information demodulated and extracted by the transceiver from transmissions from the supervisory controller 450 via the wireless communication network 440. The control data is routed to the local controller and/or directly to the actuator(s) 414 as a control signal 422. The interface 406 also receives information from the control handling parts, including the sensor(s), about values and/or states of the physical entity 410 and/or the local control thereof. This information may include the sensor signals 418 and an information signal 424 provided by the local controller 404. Data required or desired by the supervisory controller 450 is extracted and possibly packaged and transmitted as a data signal 426 to the transceiver 402 for transmission to the supervisory controller 450 via the wireless communication network 440.

The interface 406 also receives a communication state signal 428 from the transceiver 402, which includes information about any present or imminent communication interrupts. This information may be directly derived from control signalling information available in the transceiver or may already be processed to agree with the states/sub-states discussed above. The interface 406 may process the received information to provide a control approach signal 430 to the local controller 404. The control approach signal 430 may be in any form usable for the local controller 404 to determine its preferred way of operating. That is, the information may be raw data about the communication state such that the local controller 404 itself determines the way of operating, status information, e.g. indicating one of the states or sub-states as discussed above, or direct control signals for controlling e.g. multiplexers etc. of the local controller 404.

Figure 5:
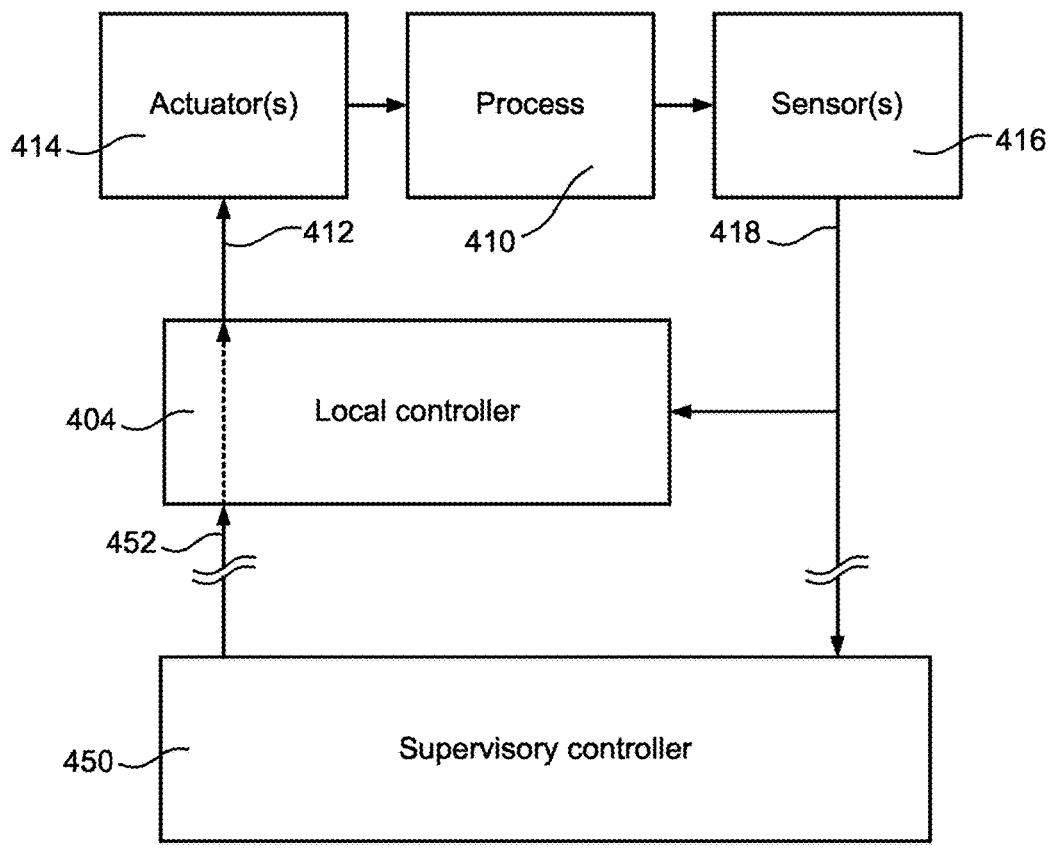
FIG. 5 schematically illustrates a controller arrangement in a situation where no interrupts are present or imminent.

FIG. 5 schematically illustrates the controller arrangement 400 in a situation where no interrupts are present or imminent. Here, only the control elements are shown since only one communication state is discussed. Furthermore, the communication parts are only illustrated by the divided connection lines to the supervisory controller 450. This state includes closed loop control from the supervisory controller 450, wherein a control signal 452 is provided to the local controller 404, and/or directly to the actuator(s) 414, such that the actuator(s) 414 receives the control signal 412. The actuator(s) 414 affects, based thereon, the physical entity 410, which in turn is monitored by the sensor(s) 416. The sensor(s) provide a sensor signal 418 that is provided to the supervisory controller 450. That is, a closed loop control from the supervisory controller 450 is provided. As discussed in the introductory part of this disclosure, some parts of the physical entity may still be desired to be handled by the local controller 404 although a closed loop control is provided from the supervisory controller 450, and the sensor signal 418 is thus also provided to the local controller 404.

Figure 6:
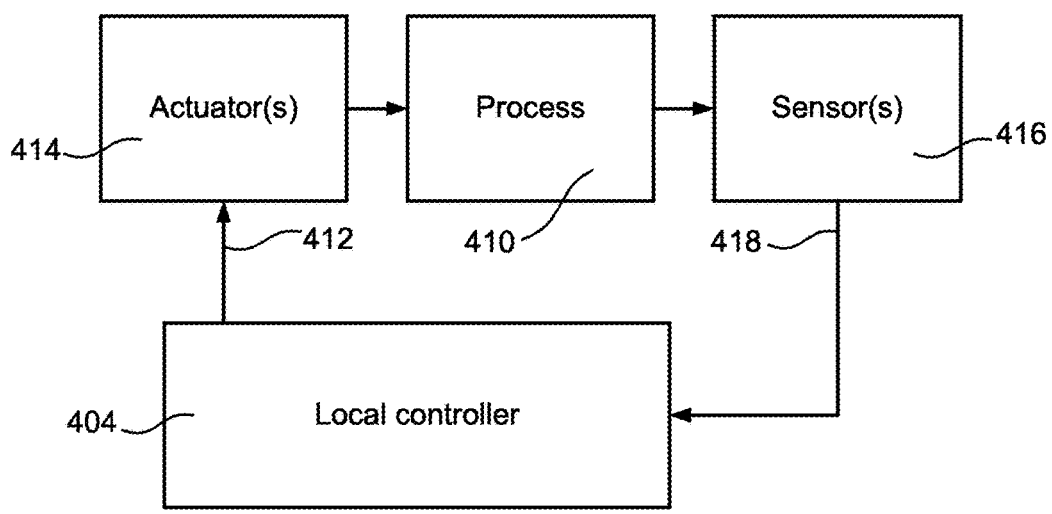
FIG. 6 schematically illustrates a controller arrangement in a situation where interrupts are present or imminent.

FIG. 6 schematically illustrates the controller arrangement 400 in a situation where interrupts are present or imminent. This situation may be seen as the second sub-state of the second state in the example discussed above, i.e. the interrupt is of such character that the local controller 404 will perform autonomous control. Thus, the control loop only includes the local controller 404 providing the control signal 412 to the actuator(s) 414 which based thereon affects the physical entity 410. The sensor(s) 416 monitor the physical entity and provide the sensor signal 418 to the local controller 404.

Figure 7:
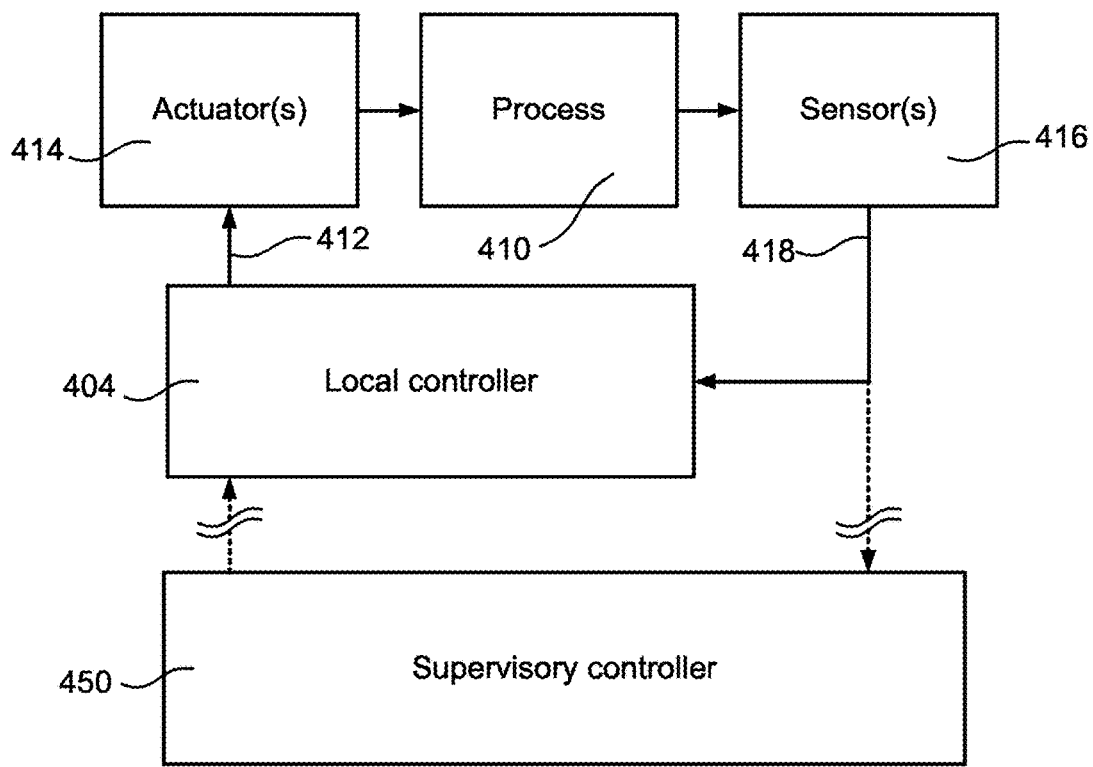
FIG. 7 schematically illustrates a controller arrangement in a situation where interrupts are present or imminent.

FIG. 7 schematically illustrates the controller arrangement 400 in a situation where interrupts are present or imminent. This situation may be seen as the first sub-state of the second state in the example discussed above, i.e. the interrupt is of such character that the local controller 404 will perform some kind of hybrid control, i.e. autonomous control by the local controller 404 and open loop control from the supervisory controller 450. Thus, the provision of information to and from the supervisory controller 450 is illustrated as dashed lines indicating that time-critical control is disabled and only the open loop control is applicable.

An example for the context of a cellular communication network will now be given with reference to FIGS. 8 to 12 in which a limited number of states and sub-states are demonstrated to align with the functional description of the operation with reference to FIGS. 5 to 7. It should be noted that further states and sub-states are feasible and should be adapted to the particular features and needs of the communication system and the control system.

Figure 8:
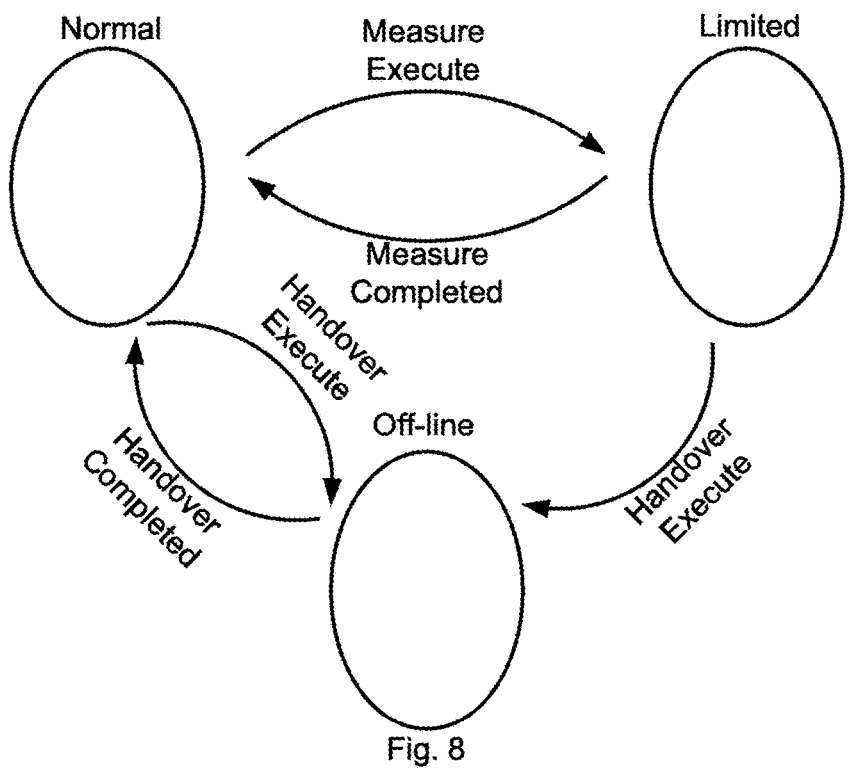
FIG. 8 is a state diagram illustrating three states.

FIG. 8 is a state diagram illustrating three states: Normal, Limited and Off-line. Here, the state Normal may be representing the first state discussed in the example above and the function may correspond to that demonstrated with reference to FIG. 5. The state Off-line may be representing the second state, first sub-state, discussed in the example above and the function may correspond to that demonstrated with reference to FIG. 6. The state Limited may be representing the second state, second sub-state, discussed in the example above and the function may correspond to that demonstrated with reference to FIG. 7.

Figure 9:
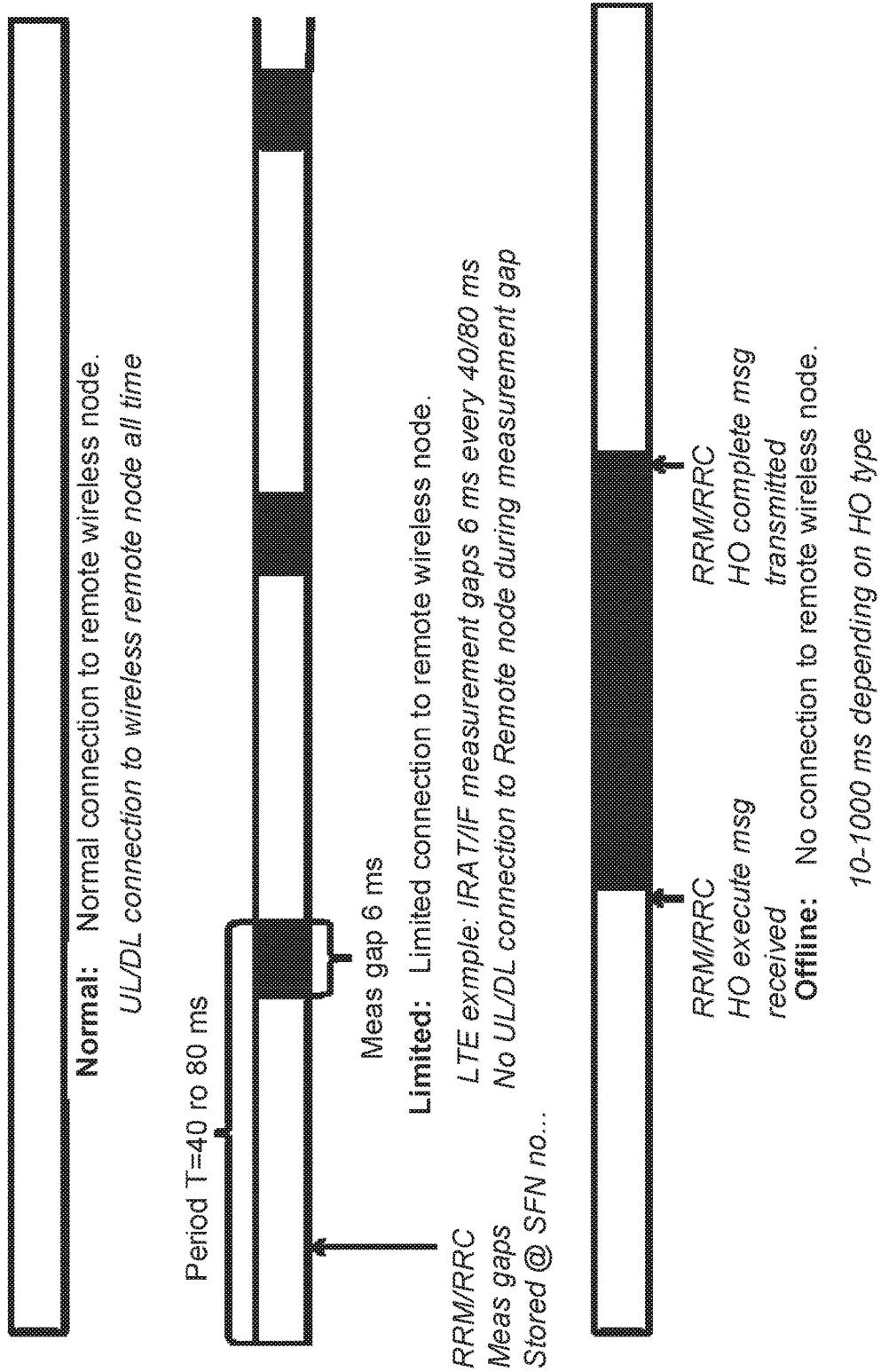
FIG. 9 shows some principle communication modes related to mobility and handover (HO), with timings related to LTE.

One central feature of cellular systems is seamless mobility, i.e. the possibility for the transceiver to move between serving base stations (Node Bs, eNode Bs, etc. depending on used Radio Access Technology (RAT), hereafter referred to as network (NW) nodes which thus refers to nodes of the access network) "without" interrupt of the ongoing service. Without interrupt should be interpreted as that the application is not interrupted, since on the physical layer it will be a necessary interrupt in the communication between the device and the NW node. FIG. 9 shows some principle communication modes related to mobility and handover (HO), with timings related to LTE. Other systems, such as WCDMA and GSM, have similar principles, but may use other timings. In the Normal mode, the transceiver is connected to the NW node and the uplink (UL) and downlink (DL) communication are made without any interrupt.

Typically a low cost transceiver is not able to communicate on two different carrier frequencies simultaneously. Therefore, in case inter-frequency (IF) or inter-RAT (IRAT) HO is needed, due to the transceiver going out of coverage of serving cell and no strong intra frequency cells exists, the transceiver triggers IF/IRAT measurement. Then the NW node configures measurement gaps, which may be 6 ms every 40 or 80 ms in LTE, where the transceiver can switch frequency and do IF/IRAT measurements. During these 6 ms there is no possibility for UL or DL communication with the NW node, and hence the communication with the NW node is Limited.

Finally when a HO have been triggered by the modem, i.e. a neighbouring cell either intra- or inter-frequency or IRAT has become sufficiently strong compared to the current serving cell, the transceiver reports that to the NW node, i.e. as a "HO event", and the NW node transmits a HO execute Radio Resource Control (RRC) message, which means "do HO to a target cell", to the transceiver, and the transceiver starts to synchronize to the target cell. During the HO operation, for the supervisory control application demonstrated above, the transceiver is considered to be Off-line since the duration for a HO operation may be long in sense of control operations. Once being in-synchronization, the transceiver then makes a random access transmission to the NW node and the connection to the new cell is initiated. Once a HO message complete message is transmitted from the transceiver to the NW node, the UL/DL data communication can start again, i.e. return to Normal. Hence, during this synchronization and initialization period, that may last, normally an in advance unknown time, between 10-1000 ms depending on HO type, i.e. IRAT takes longer than LTE intra frequency HO, the transceiver is Off-line with regard to the NW node, and so particularly in sense of the controller application, and no data communication in UL and DL is possible. Sometimes a regular HO process is substituted with a procedure where connection is released with a redirection instruction, and then a connection reestablishment, depending on network settings, wherein the procedure and thus the interrupt may take even longer time. Here, it is to be noted that not every measurement leads to a HO event, and the measurement operation may be considered complete and the state may return to Normal. Further, it is to be noted that a HO event also can occur without the measurement procedure demonstrated above, wherein a transition may be directly from Normal to Off-line.

Thus, the transitions between the states, which are also referenced to in some examples below, can for the cellular example be defined as Handover-Execute (HE)—Emitted when the transceiver is ordered to perform a hand-over. After this event the mobile unit is not connected to the network until HC (see below) occurs.

Handover-Complete (HC)—Emitted when the hand-over is complete and the transceiver is yet again connected to the network.

Measure-Execute (ME)—Emitted when the transceiver is ordered to perform a link quality measurement on another Radio Access Technology (RAT) or other carrier frequency. After this event the connectivity is degraded until e.g. MC (see below) occurs.

Measure-Complete (MC)—Emitted when the measurement gaps are complete and the link quality is restored.

All events may contain additional data, including current bandwidth etc.

Figure 10:
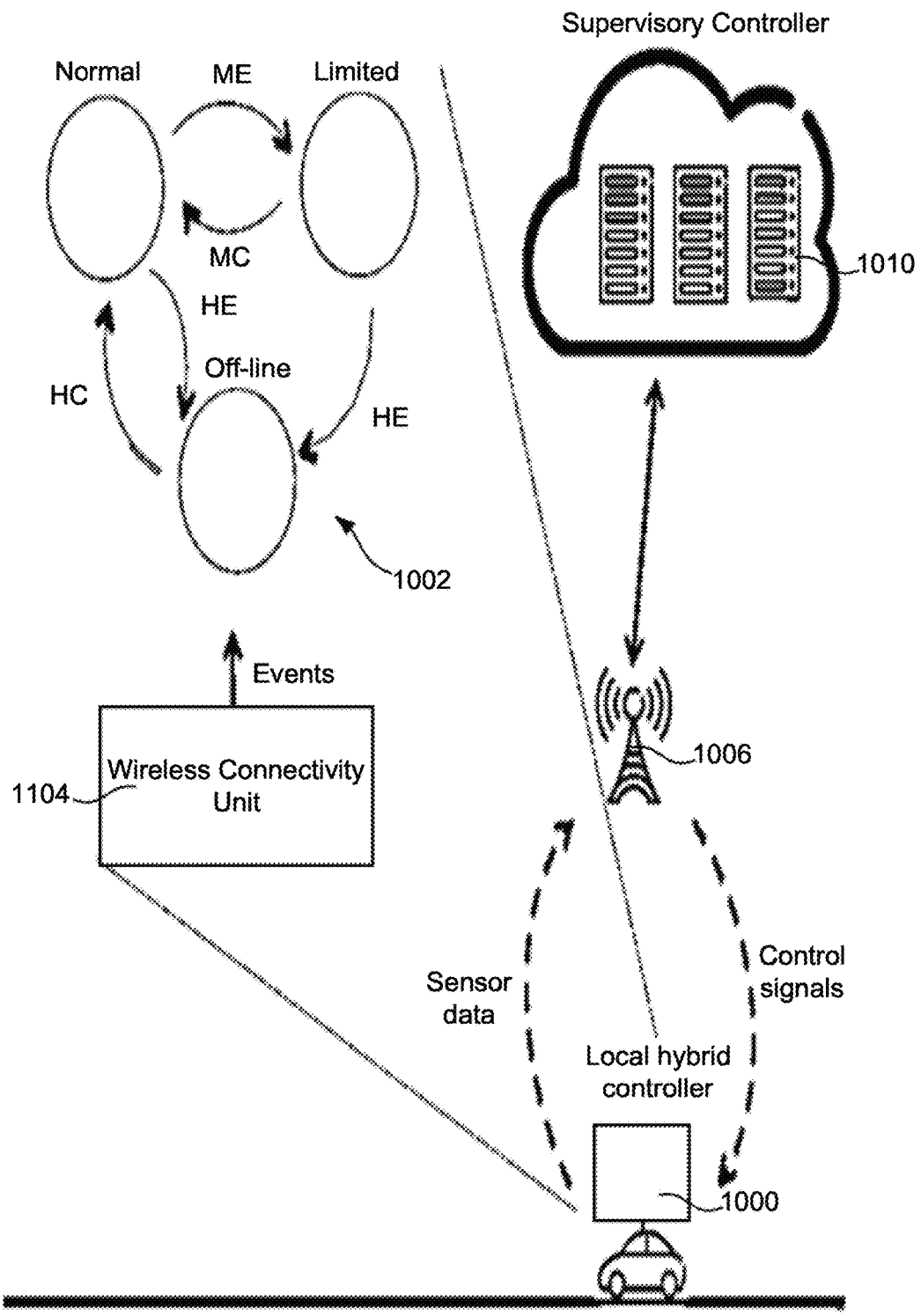
FIG. 10 shows a mobile controller unit which handles sensing and actuation and is connected to a supervisory control system in the cloud.

One possible setup presented in FIG. 10, which shows a mobile controller unit, which handles sensing and actuation and is connected to a supervisory control system in the cloud. On the mobile node there a local controller application ("App Unit") that receives events from the Wireless Connectivity Unit (WCU), which in this case corresponds to a cellular modem.

FIG. 10 shows an example employing the approach demonstrated above. A mobile controller unit 1000, which handles sensing and actuation and is connected to a supervisory controller 1010, e.g. implemented in the cloud. On the mobile controller unit 1000 there is a local controller application ("App Unit") 1002, illustrated by a state diagram similar to that shown in FIG. 8, which receives events from a Wireless Connectivity Unit (WCU) 1004, which in this case corresponds to a cellular modem, i.e. a transceiver as demonstrated above, which also connects to the supervisory controller 1010 via a wireless network 1006.

Figure 12:
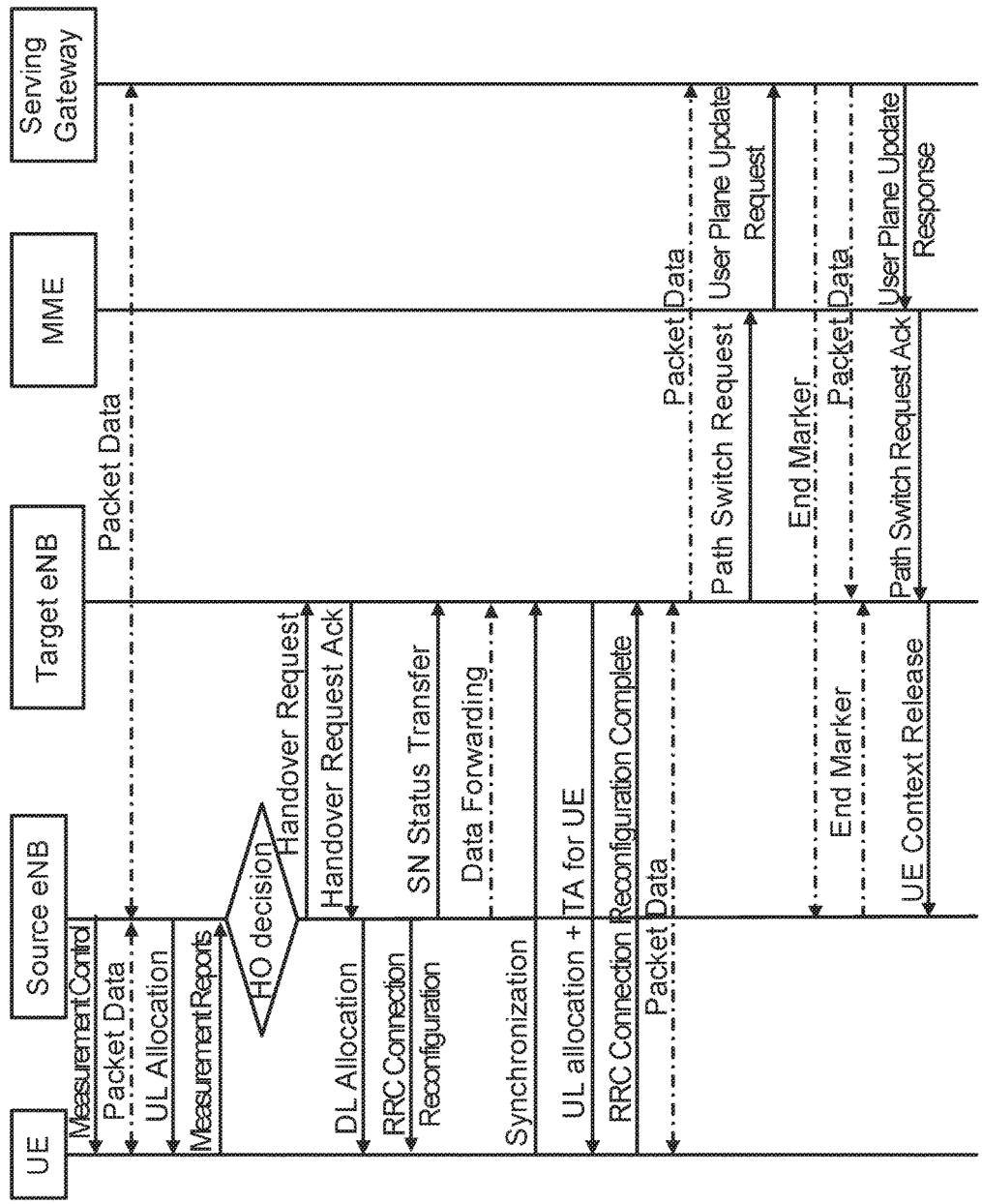
FIG. 12 illustrates an example of a HO process.

For the easier understanding of this disclosure, FIG. 12 illustrates an example of a HO process. The corresponding states HE, HC, ME, MC can be mapped to received or transmitted Radio Resource Control/Management (RRC/RRM) messages in the mobile. For example HE corresponds to RRC Connection configuration, including HO information and is received in the WCU 1004 after transmission of measurement report including HO event from the WCU and HC corresponds to RRC Connection Reconfiguration Complete. Furthermore, ME corresponds to RRC Connection configuration, including measurement gap information and received in the device after transmission of measurement report including event for triggering IRAT/IF measurement from the WCU 1004, and MC corresponds to RRC Connection Reconfiguration Complete. Once such message is transmitted (or received) by the mobility management unit in the WCU 1004, that information is fed from the WCU 1004 to the application unit using the new interface and protocol.

Figure 11:
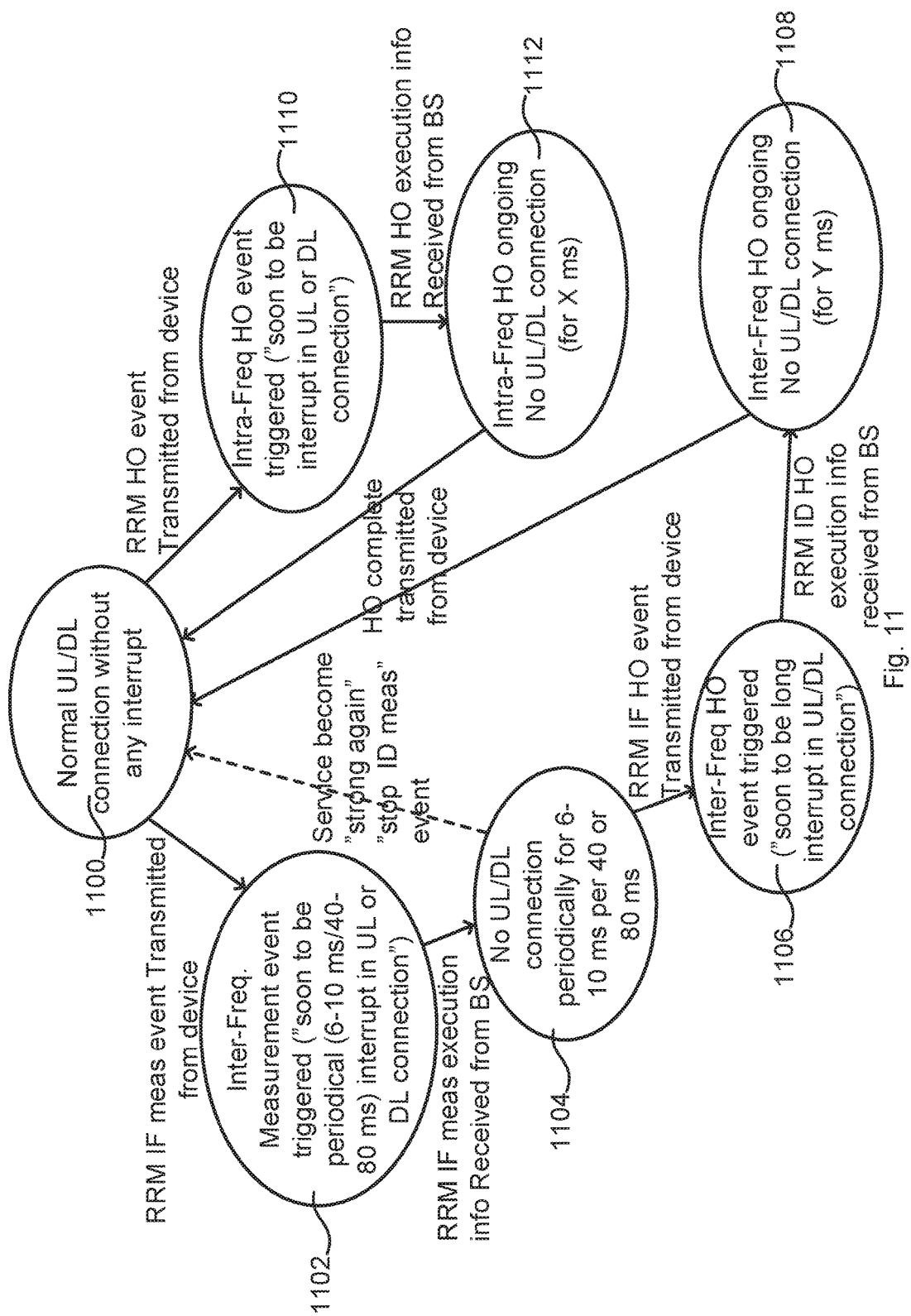
FIG. 11 shows a state machine describing the states of the communication channel.

FIG. 11 shows a state machine describing the states of the communication channel. "RRM HO event Transmitted from Device" corresponds to Measurement Reports, prior to HO decision in FIG. 12 and "HO execution" and "HO complete" to RRC Connection configuration and RRC Connection Reconfiguration Complete message, respectively, in FIG. 12. Corresponding mapping between the state transitions in FIG. 11 and RRC messages for the measurement gaps can also be found in the 3GPP specifications. FIG. 11 may also be seen as a more detailed example, and in the context of 3GPP LTE, of what is illustrated in FIG. 8.

Consider a transceiver, e.g. the WCU 1004 as illustrated in FIG. 10, operating in a first state 1100 where UL/DL connection is without any interrupt. Upon an RRM IF measurement event transmitted from the transceiver to the NW node, e.g. triggered by a signal-to-noise ratio (SNR) being below a threshold, the transceiver enters a second state 1102 where the transceiver knows that interrupts in the connection is imminent and can provide that information to the control mechanism as discussed above. Upon receiving RRM IF measurement execution information from the NW node, the transceiver enters a third state 1104 where inter-frequency measurements take place periodically, e.g. 6-10 ms each 40 or 80 ms, wherein connection is limited due to the inability to communicate during the measurements. If the signal from the serving NW node becomes strong again, e.g. the SNR becomes above the threshold, the transceiver may return to the first state 1100 and the control mechanism is informed accordingly. If the transceiver found a more promising NW node by the measurements, it may send an RRM IF HO event to the NW node and the transceiver enters a fourth state 1106 where inter-frequency HO is triggered and the control mechanism is informed that a longer interrupt is imminent. When the transceiver receives RRM IF HO execution information from the NW node, the transceiver enters a fifth state 1108 wherein the transceiver synchronizes etc. with the target NW node. This may take a longer time, say a couple of 100's of ms, and the time is hard to predict. When connected to the target NW node, HO is completed and the transceiver returns to the first state 1100 and the control mechanism is informed accordingly.

Consider the transceiver operating in the first state 1100 and an RRM HO event is transmitted from the transceiver to the NW node directly, i.e. without the measurements demonstrated above, the transceiver enters a sixth state 1110 where an intra-frequency HO event is triggered. The control mechanism is informed that a longer interrupt is imminent. When the transceiver receives RRM HO execution information from the NW node, the transceiver enters a seventh state 1112 where intra-frequency HO is performed wherein the transceiver synchronizes etc. with the target NW node. This may take a longer time, say a couple of 100's of ms, and the time is hard to predict. When connected to the target NW node, HO is completed and the transceiver returns to the first state 1100 and the control mechanism is informed accordingly.

FIGS. 13 to 16 illustrate interrupts in a mobility scenario according to embodiments. FIGS. 13 to 16 have been drawn to have resemblance with FIG. 10 of elements for the easier understanding impact of the mobility scenario to control states. The mobility scenario may include different handover situations in a cellular wireless communication network, including also inter-RAT handover between cellular RATs. As mentioned above, a regular HO process may be substituted with a procedure where connection is released with a redirection, and then a connection reestablishment, depending on network settings, wherein the procedure and thus the interrupt may take even longer time. The mobility scenario may also include short range communication network where connection is moved between access points of the wireless communication network. The mobility scenario may also include that connection is moved between a cellular communication network node and a network node, e.g. an access point, of a short range communication network, and vice versa.

Figure 13:
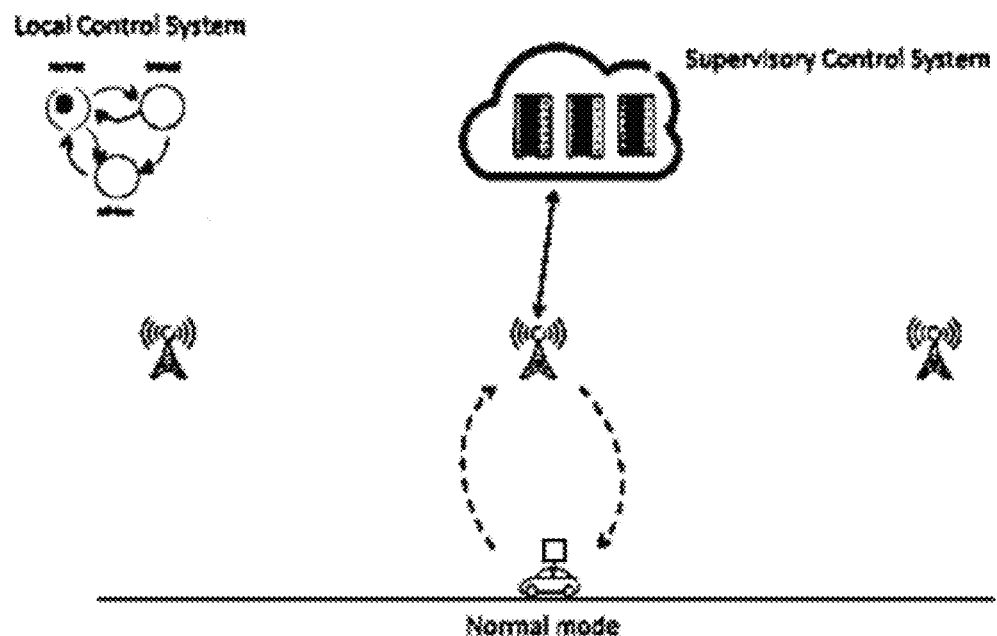
FIGS. 13 to 16 illustrate interrupts in a mobility scenario according to embodiments.
Figure 14:
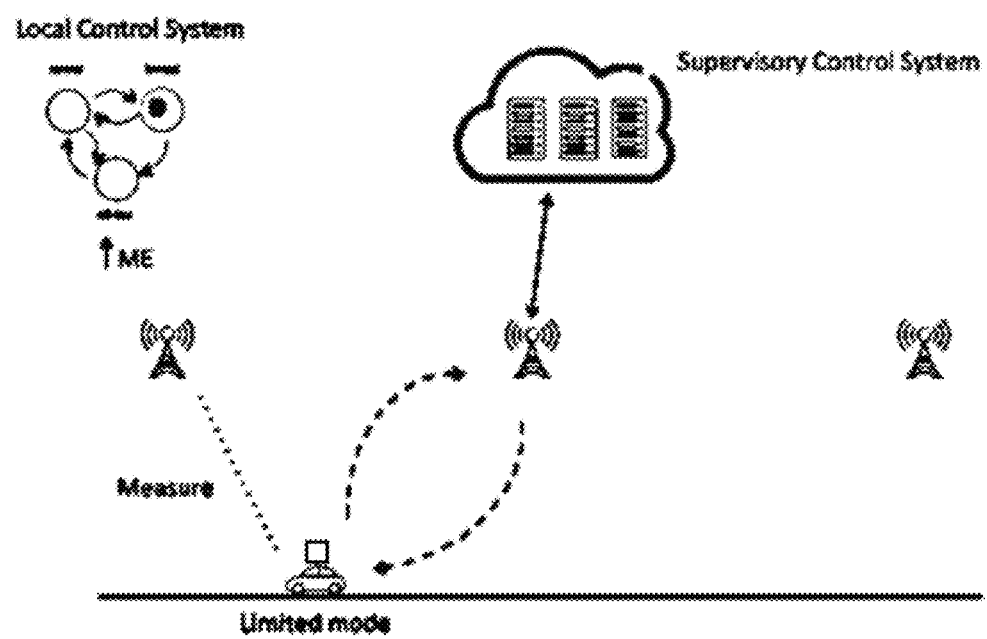
Figure 15:
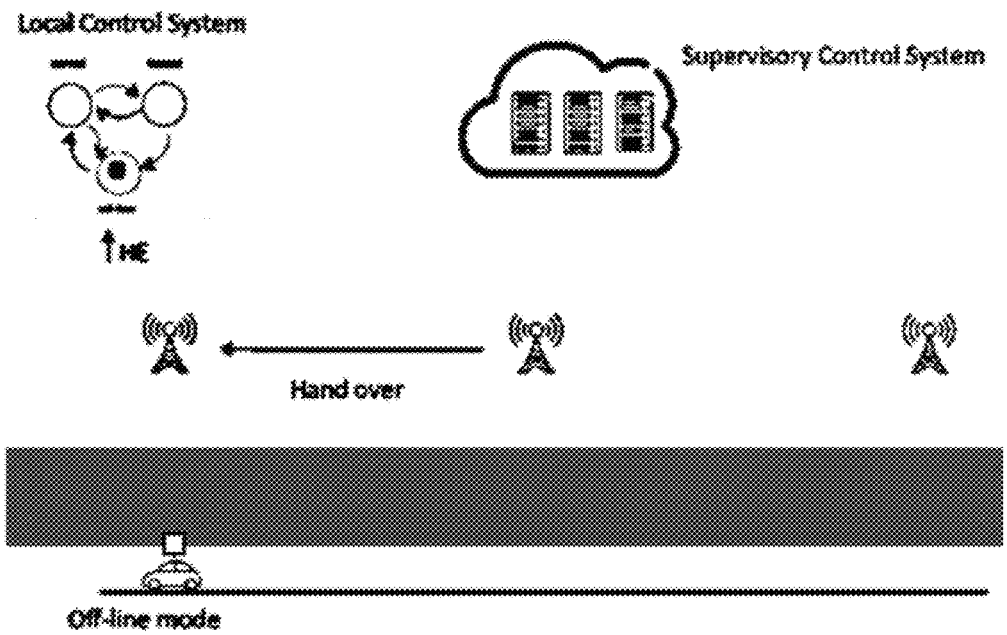
Figure 16:
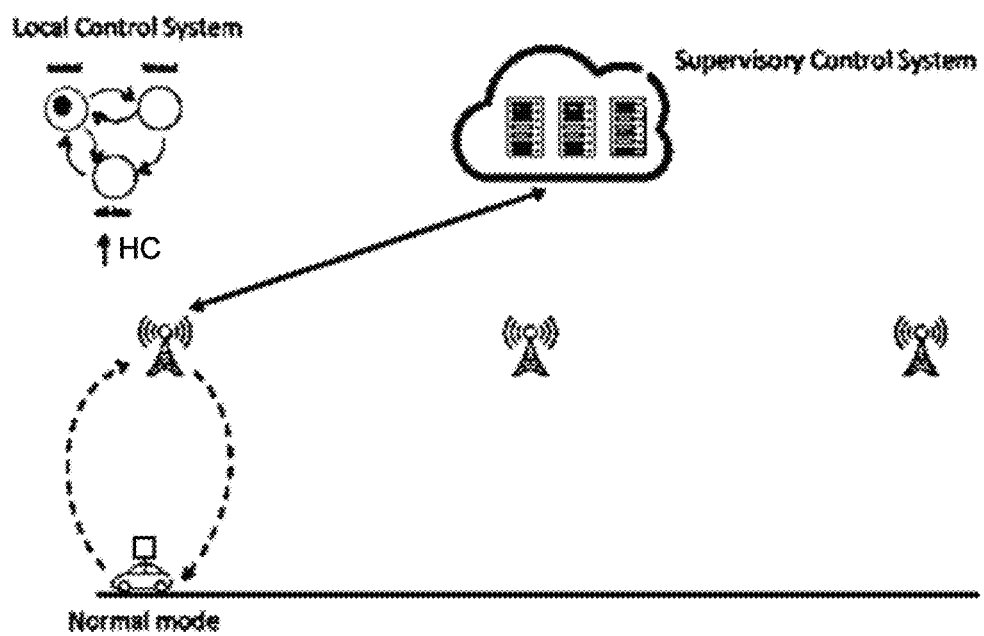

FIG. 13 illustrates that connection without interrupts is ongoing. For a local control system, illustrated by a state diagram similar to that illustrated with reference to FIGS. 8 and 10, this operates in a first state employing closed loop control from a supervisory controller. The current state is indicated by a dot in the state diagram. FIG. 14 then illustrates that the controller arrangement and thus the transceiver has moved in relation to nodes of the communication network, and the transceiver has started to make measurements on neighbouring network nodes. A measurement execute, ME, instruction causes the state to change to a limited connection state, as indicated by the dot in the state diagram, and the local controller starts to perform control more autonomous, e.g. with aid of open loop control from the supervisory controller. FIG. 15 illustrates that a handover execute, HE, instruction is received and the state is changed to an off-line state, as indicated by the dot, since no communication is available for some time, e.g. 10-1000 ms. The time is normally hard to estimate, and also the open loop control from the supervisory controller cannot be relied on. Thus, the local controller is left to perform autonomous control. FIG. 16 illustrates that the transceiver has synchronized to the target network node and a handover complete, HC, may be issued. The state thus returns to normal state wherein control again may be performed as closed loop control from the supervisory controller via the target network node.

The scenario illustrated with reference to FIGS. 13 to 16 has been described in the context of a cellular network by the reference to the handover procedure, but similar may apply for a short range wireless communication network where the transceiver makes transitions between different access points when moving. In some short range wireless communication systems, mobility does not rely on signalling for handover, and the states may for example be defined for synchronization states of the transceiver to the different access points, whether authentication and/or association is to be performed, measurements performed on other access points, estimated back-off times, etc. or a combination of any of these. The transitions between states for the controller is however similar where communication for some periods may by limited or be considered as off-line for the time constraints of control operations.

It is to be noted that a wireless connectivity unit of a controller arrangement as demonstrated above may be arranged both for operation in cellular and short range communication networks where communication is selected where desired backhaul properties are provided. Thus, a combination of the features above may be provided such that the controller arrangement is enabled to operate via the desired network. Thus, for a transition between the network types, an interrupt is also caused, which is most likely to be such that the second sub-state of the second state is entered during that interrupt. An exception is where the wireless transceiver unit is capable of keeping connection running with both the network types at the same time and the transition of the backhaul can be switched swiftly.

Figure 17:
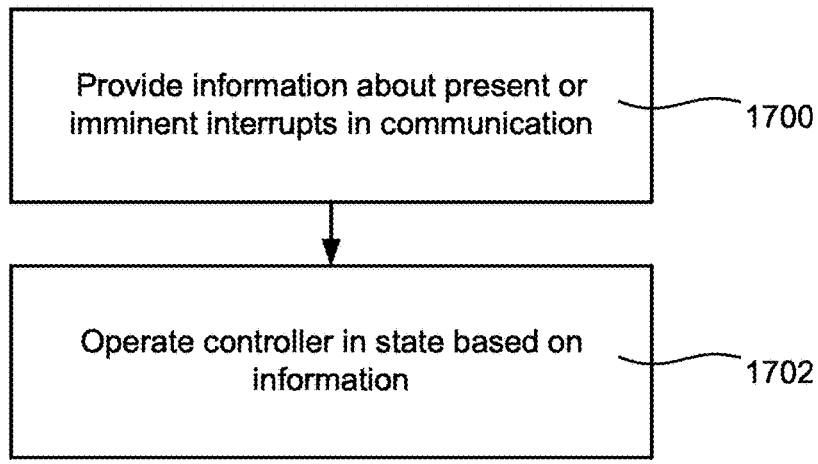
FIG. 17 is a flow chart schematically illustrating a method according to embodiments.

FIG. 17 is a flow chart schematically illustrating a method according to embodiments for a controller arrangement as described by the variants above. Information about present or imminent interrupts in communication is provided 1700 by a wireless connectivity unit, i.e. a transceiver of the controller arrangement. This information may for example be based, as demonstrated above, on signalling, estimates, etc. by the wireless connectivity unit. The controller is then operated 1702 in a state corresponding to the information. In addition to the already demonstrated variants of the approach, some examples will be given with reference to FIGS. 18 and 19. The skilled reader will however understand from the disclosure above that observed parameters of the communication may be substituted with others indicating nature of interrupts, and that only two states (without the sub-states) for operating the controller are also a feasible implementation, as well as that an implementation with more states and/or sub-states for operating the controller is feasible for a situation where the nature of the interrupts is defined with greater granularity.

Figure 18:
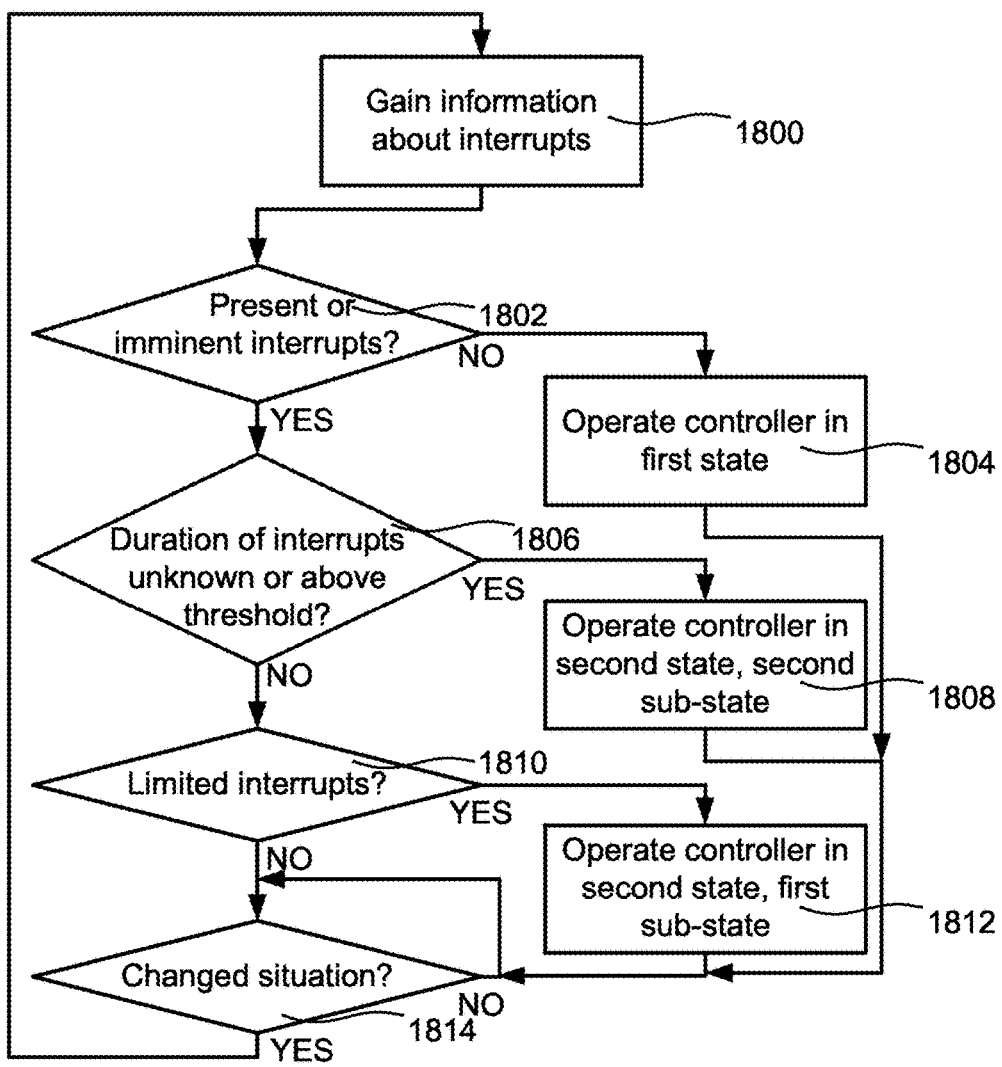
FIG. 18 is a flow chart illustrating an example of a method.

FIG. 18 is a flow chart illustrating an example of a method for the example of two states wherein the second state comprises two sub-states as also exemplified above, i.e. the controller may be operated for the different states similar to what has been described above. Information about any interrupts is gained 1800. Based on the information, it is determined 1802 whether any interrupt is present or imminent. If no interrupt is present or imminent, the controller is operated 1804 in the first state, i.e. including closed loop control from the supervisory controller. If interrupt is present or imminent, it is determined 1806 whether duration of interrupt(s) is unknown or above a threshold, i.e. uncertain or impossible for the supervisory controller to perform control, the controller is operated 1808 in the second state, and in the second sub-state of the second state, i.e. the local controller will have to act autonomously during the interrupt. If the duration is below the threshold (implicating that the duration is known or reliably estimated), it is determined 1810 whether (or that, since there might not be any cases where this determination emanates in a "NO", depending on the implementation) limited interrupts are present wherein the controller is operated 1812 in the first sub-state of the second state, i.e. the supervisory controller may perform an open loop control and the local controller may perform some control tasks autonomously.

Whichever state the controller is operated in, a change in the communication situation is monitored 1814, and upon a change in the communication situation, the process returns to gaining 1800 the information thereabout and determine proper operation of the controller.

Figure 19:
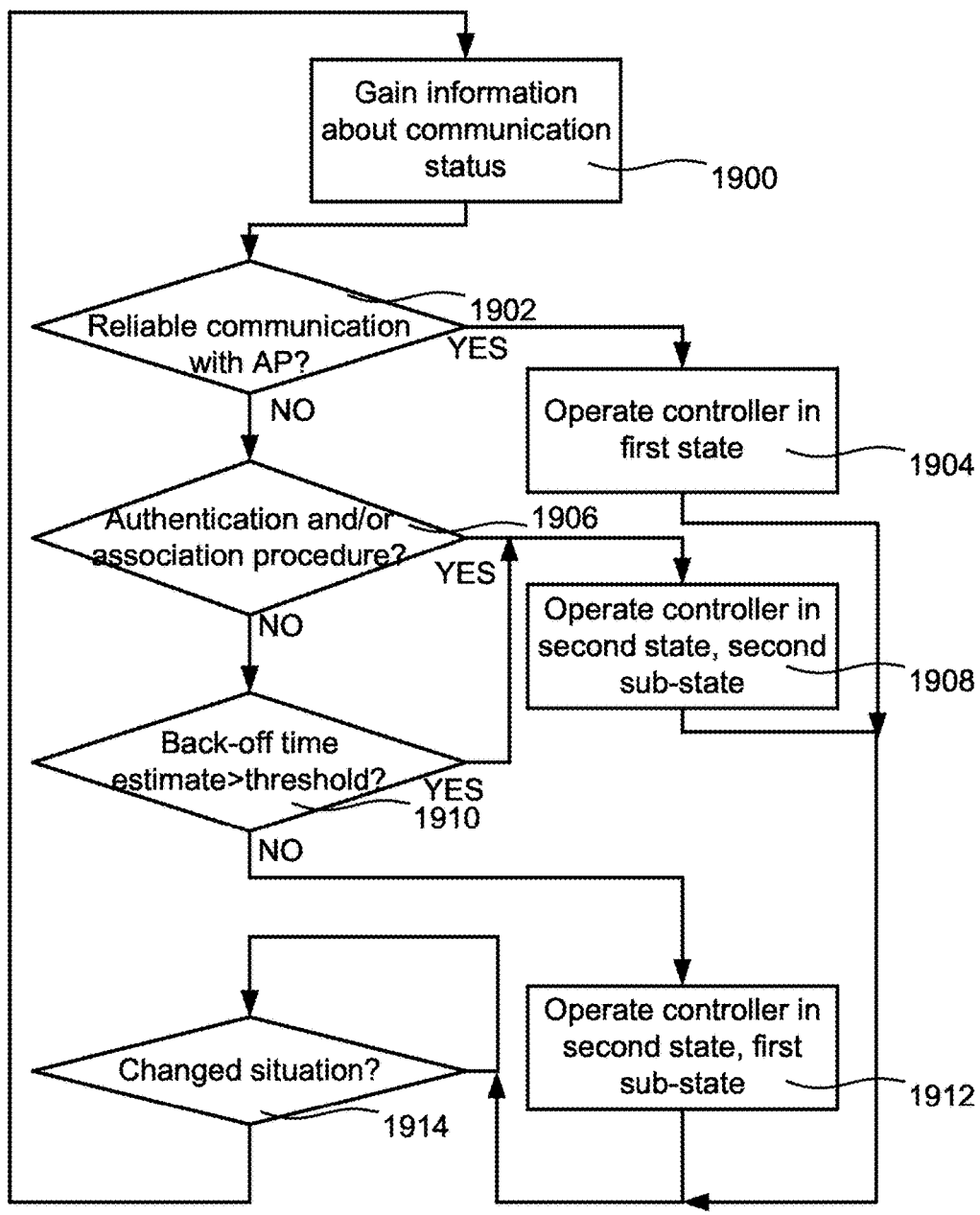
FIG. 19 is a flow chart illustrating an example of a method for a short range wireless network context.

FIG. 19 is a flow chart illustrating an example of a method similar to the one demonstrated with reference to FIG. 18, but here more specifically in an example of a short range wireless network context. Information about communication status is gained 1900 with the aim to detect or forecast any interrupts in the communication. Based on the information, it is determined 1902 whether communication with an access point is reliable, i.e. whether any interrupt is present or imminent. If no interrupt is present or imminent, the controller is operated 1904 in the first state, i.e. including closed loop control from the supervisory controller. If interrupt is present or imminent, it is for example determined 1906 whether an authentication and/or association procedure is to be made, wherein duration of the interrupt is unknown or inherently above the threshold, i.e. uncertain or impossible for the supervisory controller to perform control. The controller is then operated 1908 in the second state, and in the second sub-state of the second state, i.e. the local controller will have to act autonomously during the interrupt. If no such time consuming activity or hard-to-predict duration is present or imminent, it is determined 1910 whether for example an estimate of back-off time is above the threshold. If the estimated time is above the threshold, the controller is operated 1908 in the second state, and in the second sub-state of the second state. If the estimated time is below the threshold, the controller is operated 1912 in the first sub-state of the second state, i.e. the supervisory controller may perform an open loop control and the local controller may perform some control tasks autonomously.

Whichever state the controller is operated in, a change in the communication situation is monitored 1914, and upon a change in the communication situation, the process returns to gaining 1900 the information thereabout and determine proper operation of the controller.

Figure 20:
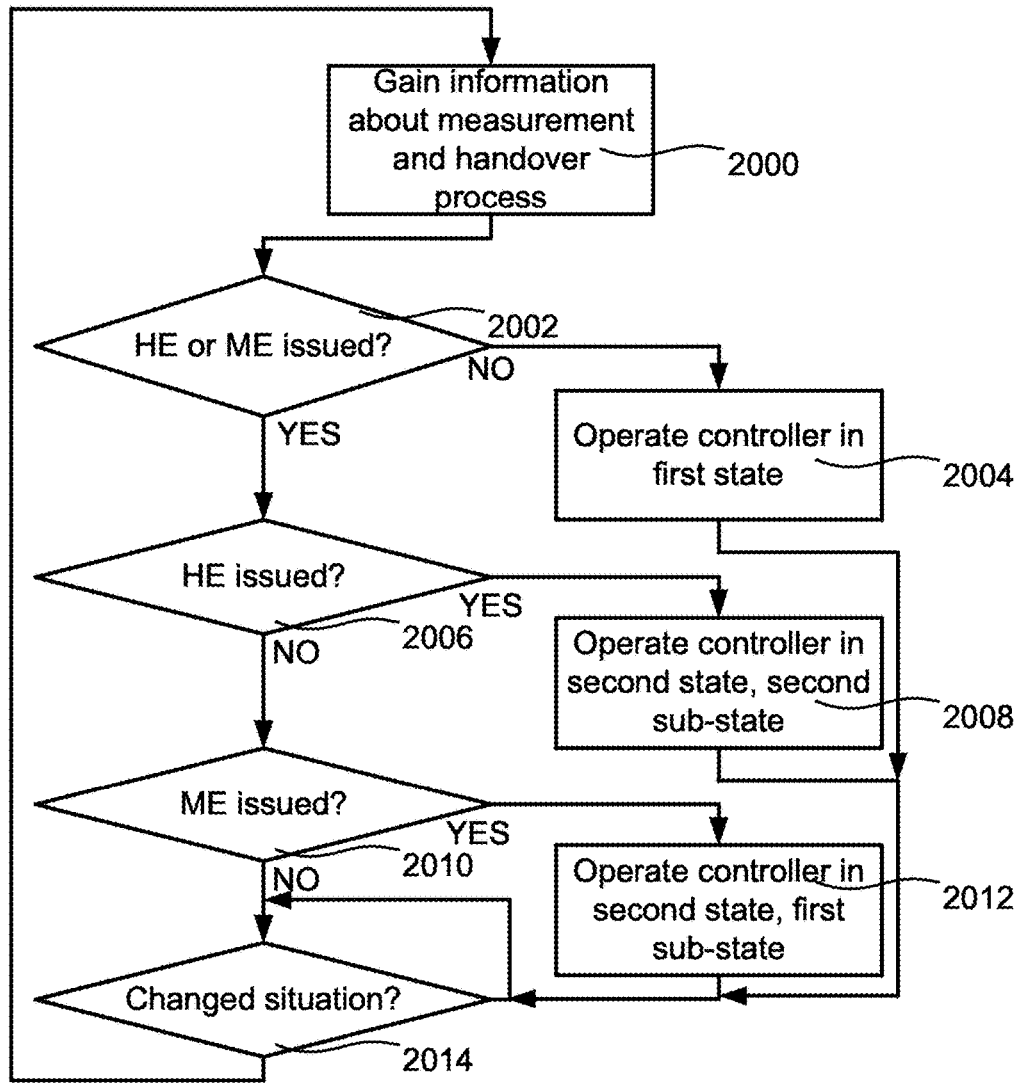
FIG. 20 is a flow chart illustrating an example of a method for a cellular wireless network context.

FIG. 20 is a flow chart illustrating an example of a method similar to the one demonstrated with reference to FIG. 18, but here more specifically in an example of a cellular wireless network context. Information about communication status, i.e. measurement and handover process, is gained 2000 with the aim to detect or forecast any interrupts in the communication. Based on the information, it is determined 2002 whether a handover execute (HE) or measurement execute (ME) is issued, i.e. whether any interrupt is present or imminent. If no interrupt is present or imminent, i.e. no HE or ME issued, the controller is operated 2004 in the first state, i.e. including closed loop control from the supervisory controller. If HE or ME is issued, an interrupt is present or imminent, it is determined 2006 whether HE is issued, wherein duration of the interrupt is unknown or inherently above the threshold, i.e. uncertain or impossible for the supervisory controller to perform control. The controller is then operated 2008 in the second state, and in the second sub-state of the second state, i.e. the local controller will have to act autonomously during the interrupt. If no such time consuming activity or hard-to-predict duration is present or imminent, it is determined 2010 whether ME is issued. If ME is issued, the controller is operated 1912 in the first sub-state of the second state, i.e. the supervisory controller may perform an open loop control and the local controller may perform some control tasks autonomously. Here, the "NO" option of the determination 2010 logically seems like an empty amount in light of the determinations 2002 and 2006. However, for some implementations, the determination 2002 may for some implementations include further events, which also may implicate further checks (not shown) resulting in further selectable operation states for the controller. Thus, the "NO" option here is to be considered as a symbol for such further optional checks.

Whichever state the controller is operated in, a change in the communication situation is monitored 2014, and upon a change in the communication situation, the process returns to gaining 2000 the information thereabout and determine proper operation of the controller.

Figure 21:
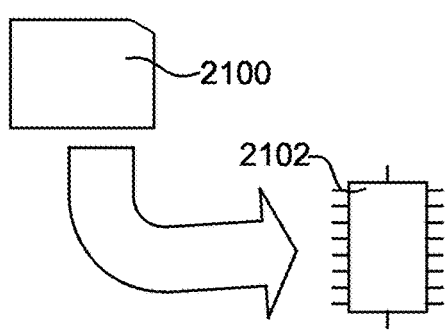
FIG. 21 schematically illustrates a computer-readable medium comprising a computer program with instructions, which when executed on the illustrated processing means causes the processing means to perform methods of embodiments.

The methods according to the present invention are suitable for implementation with aid of processing means, such as computers and/or processors. Therefore, there is provided computer programs, comprising instructions arranged to cause the processor or computer to perform the steps of any of the methods according to any of the embodiments described above, particularly those with reference to FIG. 17 to 20. The computer programs preferably comprises program code which is stored on a computer readable medium 2100, as illustrated in FIG. 21, which can be loaded and executed by a processing means, processor, or computer 2102 to cause it to perform the methods, respectively, according to embodiments of the present invention, preferably as any of the embodiments described with reference to FIGS. 17 to 20. The computer 2102 and computer program product 2100 can be arranged to execute the program code sequentially where actions of the any of the methods are performed stepwise. The processing means, processor, or computer 2102 is preferably what normally is referred to as an embedded system. Thus, the depicted computer readable medium 2100 and computer 2102 in FIG. 21 should be construed to be for illustrative purposes only to provide understanding of the principle, and not to be construed as any direct illustration of the elements. For example, the processing means 2102 may be distributed between the local controller, the interface and the transceiver, or when the interface is implemented in the controller or the transceiver, or distributed thembetween, the processing means 2102 may be distributed between the local controller and the transceiver. For some embodiments, the local controller may house the processing means 2102.

The invention claimed is:
1. A controller arrangement comprising
  a transceiver capable of communication via a wireless communication network;
  a controller arranged to control a physical entity at which the controller arrangement is arranged; and
  an interface between the transceiver and the controller, wherein
  the transceiver is arranged to provide information via the interface about imminent interrupts in the communication via the wireless communication network based on mobility management information associated with the wireless communication network, and
  the controller is arranged to operate in at least a first state when the information indicates that no interrupts are present or imminent, wherein the first state includes closed loop control from a remote entity via the wireless communication network, and a second state when the information indicates that interrupts are present or imminent, wherein the second state includes autonomous control operations by the controller.

2. The controller arrangement of claim 1, wherein the wireless communication network comprises a cellular communication network and the transceiver provides the information about present or imminent interrupts in the communication based on mobility management information associated with the wireless communication network.

3. The controller arrangement of claim 2, wherein the mobility management information associated with the wireless communication network comprises instructions provided from a node of the wireless communication network.

4. The controller arrangement of claim 2, wherein the mobility management information associated with the wireless communication network comprises indications on a completed task provided from the transceiver.

5. The controller arrangement of claim 1, wherein the wireless communication network comprises a short range communication network and the transceiver provides the information about present or imminent interrupts in the communication based on connection state information in relation to an access point of the wireless communication network.

6. The controller arrangement of claim 5, wherein the connection state information in relation to the access point of the wireless communication network comprises any of:
   in-synchronization with the access point;
   out-of-synchronization with the access point;
   scanning for access points ongoing;
   reconnection to an access point ongoing;
   authentication process; and
   association process.

7. The controller arrangement of claim 1, wherein the second state comprises:
   a first sub-state when the information indicates that interrupts are present or imminent during predetermined periods, wherein the first sub-state includes open loop control from the remote entity via the wireless communication network in conjunction with the autonomous control operations by the controller, and
   a second sub-state when the information indicates that interrupts are present or imminent during an unknown time, wherein the second sub-state includes the autonomous control operations by the controller without control from the remote entity via the wireless communication network.

8. The controller arrangement of claim 7, wherein the first sub-state is when a duration of the interrupt is known and below a threshold, and the second sub-state is when the duration of the interrupt is unknown or above the threshold.

9. A method of a controller arrangement comprising a transceiver capable of communication via a wireless communication network and a controller arranged to control a physical entity at which the controller arrangement is arranged, the method comprising:
   providing information by the transceiver to the controller about imminent interrupts in the communication via the wireless communication network based on mobility management information associated with the wireless communication network; and
   operating the controller in at least a first state when the information indicates that no interrupts are present or imminent, wherein the first state includes closed loop control from a remote entity via the wireless communication network, and a second state when the information indicates that interrupts are present or imminent, wherein the second state includes autonomous control operations by the controller.

10. The method of claim 9, wherein the providing of the information about present or imminent interrupts in the communication is based on mobility management information associated with the wireless communication network.

11. The method of claim 10, wherein the mobility management information associated with the wireless communication network comprises instructions provided from a node of the wireless communication network.

12. The method of claim 10, wherein the mobility management information associated with the wireless communication network comprises indications on a completed task provided from the transceiver.

13. The method of claim 9, wherein the wireless communication network comprises a short range communication network and providing of the information by the transceiver about present or imminent interrupts in the communication is based on connection state information in relation to an access point of the wireless communication network.

14. The method of claim 13, wherein the connection state information in relation to the access point of the wireless communication network comprises any of:
   in-synchronization with the access point;
   out-of-synchronization with the access point;
   scanning for access points ongoing;
   reconnection to an access point ongoing;
   authentication process; and
   association process.

15. The method of claim 9, wherein the second state comprises:
   a first sub-state when the information indicates that interrupts are present or imminent during predetermined periods, wherein the operating of the controller in the first sub-state includes open loop control from the remote entity via the wireless communication network in conjunction with the autonomous control operations by the controller, and
   a second sub-state when the information indicates that interrupts are present or imminent during an unknown time, wherein the operating of the controller in the second sub-state includes the autonomous control operations by the controller without control from the remote entity via the wireless communication network.

16. The method of claim 15, wherein the first sub-state is when a duration of the interrupt is known and below a threshold, and the second sub-state is when the duration of the interrupt is unknown or above the threshold.

17. A nontransitory computer readable storage medium comprising instructions which, when executed on a processor of a communication apparatus, causes the communication apparatus to perform a method of a controller arrangement comprising a transceiver capable of communication via a wireless communication network and a controller arranged to control a physical entity at which the controller arrangement is arranged, the method comprising:
   providing information by the transceiver to the controller about imminent interrupts in the communication via the wireless communication network based on mobility management information associated with the wireless communication network; and
   operating the controller in at least a first state when the information indicates that no interrupts are present or imminent, wherein the first state includes closed loop control from a remote entity via the wireless communication network, and a second state when the information indicates that interrupts are present or imminent, wherein the second state includes autonomous control operations by the controller.

* * * * *